United States Patent
Bragin (10) Patent No.: US 9,710,073 B2
(45) Date of Patent: Jul. 18, 2017

(54) DETACHABLE DEVICE CASE HAVING AN AUXILIARY TOUCH INPUT DEVICE AND DATA HANDLING CAPABILITY

(71) Applicant: Oleksiy Bragin, Moscow (RU)

(72) Inventor: Oleksiy Bragin, Moscow (RU)

( * ) Notice: Subject to any disclaimer, the term of this patent is extended or adjusted under 35 U.S.C. 154(b) by 0 days.

(21) Appl. No.: 14/539,701

(22) Filed: Nov. 12, 2014

(65) Prior Publication Data

US 2015/0177783 A1  Jun. 25, 2015

Related U.S. Application Data

(63) Continuation-in-part of application No. 13/802,729, filed on Mar. 14, 2013, which is a continuation-in-part of application No. 13/584,922, filed on Aug. 14, 2012, now abandoned.

(51) Int. Cl.
| | |
|---|---|
| *G06F 3/0338* | (2013.01) |
| *G06F 1/16* | (2006.01) |
| *G06F 3/042* | (2006.01) |
| *G09G 5/36* | (2006.01) |
| *G06F 3/0354* | (2013.01) |
| *G06F 3/147* | (2006.01) |

(52) U.S. Cl.
CPC .......... *G06F 3/0338* (2013.01); *G06F 1/1632* (2013.01); *G06F 3/03547* (2013.01); *G06F 3/0421* (2013.01); *G09G 5/363* (2013.01); *G06F 3/147* (2013.01); *G09G 2360/06* (2013.01); *G09G 2360/08* (2013.01)

(58) Field of Classification Search
CPC .. G06F 1/1601; G06F 3/016; G06F 2203/014; H01L 41/22; G08B 6/00; H04M 1/04
See application file for complete search history.

(56) References Cited

U.S. PATENT DOCUMENTS

| | | |
|---|---|---|
| 2005/0022130 A1 | 1/2005 | Fabritius |
| 2009/0139778 A1 | 6/2009 | Butler et al. |
| 2009/0195497 A1* | 8/2009 | Fitzgerald ............. G06F 1/3203 345/156 |
| 2011/0020771 A1 | 1/2011 | Rea et al. |
| 2011/0090626 A1 | 4/2011 | Hoellwarth et al. |
| 2011/0175827 A1 | 7/2011 | Bogue |
| 2012/0039023 A1 | 2/2012 | Renwick |
| 2012/0154133 A1* | 6/2012 | Kyung .................... G06F 3/016 340/407.1 |

(Continued)

FOREIGN PATENT DOCUMENTS

GB          2344905 A          6/2000

OTHER PUBLICATIONS

Office Actions issued by USPTO with regard to the U.S. Appl. No. 13/802,729.

(Continued)

*Primary Examiner* — Shaheda Abdin
(74) *Attorney, Agent, or Firm* — BCF LLP (57) ABSTRACT

A detachable case configured to hold an electronic device and configured to transfer control input signals from at least one touch sensitive input device disposed on a backside of the device case to the electronic device, the electronic device being configured to display graphical symbology representing a position of one or more contacts on the at least one touch sensitive input device.

7 Claims, 12 Drawing Sheets

(56) References Cited

U.S. PATENT DOCUMENTS

| | | |
|---|---|---|
| 2012/0274600 A1 | 11/2012 | Yeung |
| 2013/0050164 A1 | 2/2013 | Rericha et al. |
| 2013/0088339 A1 | 4/2013 | Lim et al. |
| 2013/0241839 A1 | 9/2013 | Walker et al. |
| 2013/0281047 A1 | 10/2013 | Daly et al. |

OTHER PUBLICATIONS

Office Actions issued by USPTO with regard to the U.S. Appl. No. 13/584,922.

* cited by examiner

DETACHABLE DEVICE CASE HAVING AN AUXILIARY TOUCH INPUT DEVICE AND DATA HANDLING CAPABILITY

RELATED APPLICATIONS

This application is a continuation-in-part of U.S. application Ser. No. 13/802,729, entitled "Detachable console for Mobile Devices" and filed on Mar. 14, 2013, which is a continuation-in-part of U.S. application Ser. No. 13/584,922, entitled "Electronic Device Case with Touch Sensitive Input" and filed on Aug. 14, 2012.

FIELD

Embodiments relate generally to mobile computing devices, and more particularly, to a detachable device case having an auxiliary touch input device and data handling capability.

BACKGROUND

Some conventional mobile devices such as wireless phones, ebook readers, media players, tablet computers, wearable computers (e.g., glasses and watches) and neural gaming devices may have a display device that can be used for games and the like. However, the processors in some of these mobile devices may not have sufficient processing throughput to render complex graphics (e.g., 3-D first person-style graphics). Also, many mobile devices have touch sensitive displays, but these displays may not be ideal for playing games in which a user may want to have maximum visibility of the screen area.

Also, some mobile devices may not have expandable memories and may have limited communication interfaces that are not able to connect with more advanced protocols (e.g., 4G LTE) that may be required or helpful when playing an online game that may require transmitting large amounts of data (graphics) via the Internet.

Further, conventional electronic device cases may be passive coverings for protecting an electronic device held within a case. Many portable electronic devices, such as wireless phones tablets, media players, electronic book players and the like have touch sensitive screens. A limitation of these conventional devices may be the amount of surface area available for use as a touch device. Also, another limitation may be that a user's hands or fingers may at least partially obstruct the screen of a device when interacting with a touch sensitive display.

Embodiments were conceived in light of the above-mentioned limitations, among other things.

SUMMARY

Some implementations can include a method. The method can include coupling an detachable console to a mobile device and receiving, at the mobile device, detachable console configuration information. The method can also include storing, in a data storage unit of the mobile device, the detachable console configuration information and receiving a request for device capabilities from an application program executing on the mobile device. The method can further include responding to the request by providing information corresponding to internal capabilities and external capabilities and performing a processing task by dividing the processing task between an internal processor and an external processor located in the detachable console. The method can also include receiving a first processing result from the internal processor and a second processing result from the external processor and combining the first processing result and the second processing result to produce a combined result. The method can further include generating output from the mobile device based on the combined result.

The processing task can include a graphics processing task and the external processor provides graphics processing support to the internal processor. Generating the output from the mobile device can include causing a graphical image to be displayed on a display of the mobile device. The graphical image can include an image based on the combined processing result.

The method can further include storing data received from the mobile device in a data storage section of the detachable console and retrieving the stored data from the data storage section of the mobile device and transferring the retrieved data to the mobile device. The method can also include providing an additional communication protocol device and decoding and encoding communications messages for the mobile device with the additional communication protocol device.

Some implementations can include an detachable console for a mobile device. The system can include a body portion adapted to receive and releasably attach to a mobile device and one or more user input devices disposed on an external surface of the body portion. The system can also include a support processor disposed within the body portion and configured to provide graphics processing support to a processor disposed within the mobile device, the one or more user input devices being coupled to the support processor. The system can further include a data storage device coupled to the support processor and configured to provide additional data storage for the mobile device, and an additional communication protocol section that, when enabled, is configured to provide additional communications protocol support for the mobile device.

The one or more user input devices can include one or more joystick input devices and one or more thumb control input devices. The additional communication protocol can include a 4G LTE SIM card slot. The system can further include an external port configured to couple the system to the mobile device, the external port being coupled to the support processor, an external mini-USB port coupled to the support processor, an external mini-HDMI port coupled to the support processor, and an external memory device interface port coupled to the support processor.

Some implementations can include a case having a body portion configured to receive an electronic device (e.g. a mobile device) and provide a removable cover for the electronic device. The case can include at least one touch sensitive input device disposed on a backside of the case (e.g., rearward facing with respect to the device when inserted into the case).

The case can also include an interface configured to transmit a signal from the at least one touch sensitive input device to the electronic device. The interface can include one or more of a universal serial bus interface, a wireless universal serial bus interface, a Bluetooth interface, a serial data interface and a parallel data interface.

The at least one touch sensitive input device can include two (or more) touch sensitive input devices. The at least one touch sensitive input device can be disposed on a back exterior surface of the case opposite from a front of the case where a screen of the electronic device is viewable. The at least one touch sensitive input device can include one or more of a resistive device, a surface acoustic wave device, a capacitive device, an infrared device, an optical imaging device, a dispersive signal device and an acoustic pulse recognition device. The capacitive device can include one or more of a surface capacitive device, a projected capacitive device, a mutual capacitance and a self-capacitance device.

The case can include a power source (e.g., battery, capacitor, power connector, or the like) configured to power the at least one touch sensitive input device and the interface. The at least one touch sensitive input device can include an edge portion configured to provide tactile feedback to a user in locating the at least one touch sensitive input device.

DETAILED DESCRIPTION

In general, an implementation can include a detachable external console (e.g., case, cover or housing) having an auxiliary touch sensitive input surface configured to supplement or provide an alternative to a primary touch sensitive input device (e.g., touch sensitive screen) of a portable handheld electronic device. The detachable external console can be configured to be affixed behind a main unit (e.g., the portable handheld electronic device) for convenience and compactness. Some implementations can provide for transferring actions of a user on the auxiliary touch sensitive input device of the console to the screen of the main unit. By providing the auxiliary touch sensitive in put surface on the console in a rearward facing configuration, an implementation can improve visibility of the screen on the main unit during use (e.g., during playing of a game on the main unit).

Some implementations can include displaying graphical feedback on the screen of the main unit to indicate the position of one or more fingers on the auxiliary touch sensitive input surface (e.g., overlay contours of user's controlling fingers shown in a shadow, outline, semi-transparent or other suitable form to permit the user to see the position of the one or more fingers while still being able to see the screen portion underneath the finger contours overlaid on the screen of the main unit).

Some implementations can include a calibration feature that helps reduce (or eliminate) random/stray clicks by fingers and parts of the hands, which are not involved in the control process. The calibration process can include displaying a representation of the auxiliary touch sensitive input device of the console on the screen of the main unit and providing user interface controls configured to permit a user to select portions of the auxiliary touch sensitive input device that are control input portions and portions that are spurious (or not used for control). For example, a user may want portions of the auxiliary touch sensitive input device of the console located where a user's index fingers may rest identified as control portions, while portions where a user's other fingers may rest on the auxiliary touch sensitive input device of the console may be identified as spurious to avoid receiving touch input from those areas.

Also, some implementations can include a capability for on-screen display on main unit of the image combined from parts (e.g., information from detachable/external console along with information received and/or processed by means of the console combined with information obtained by means of the main unit).

Figure 1:
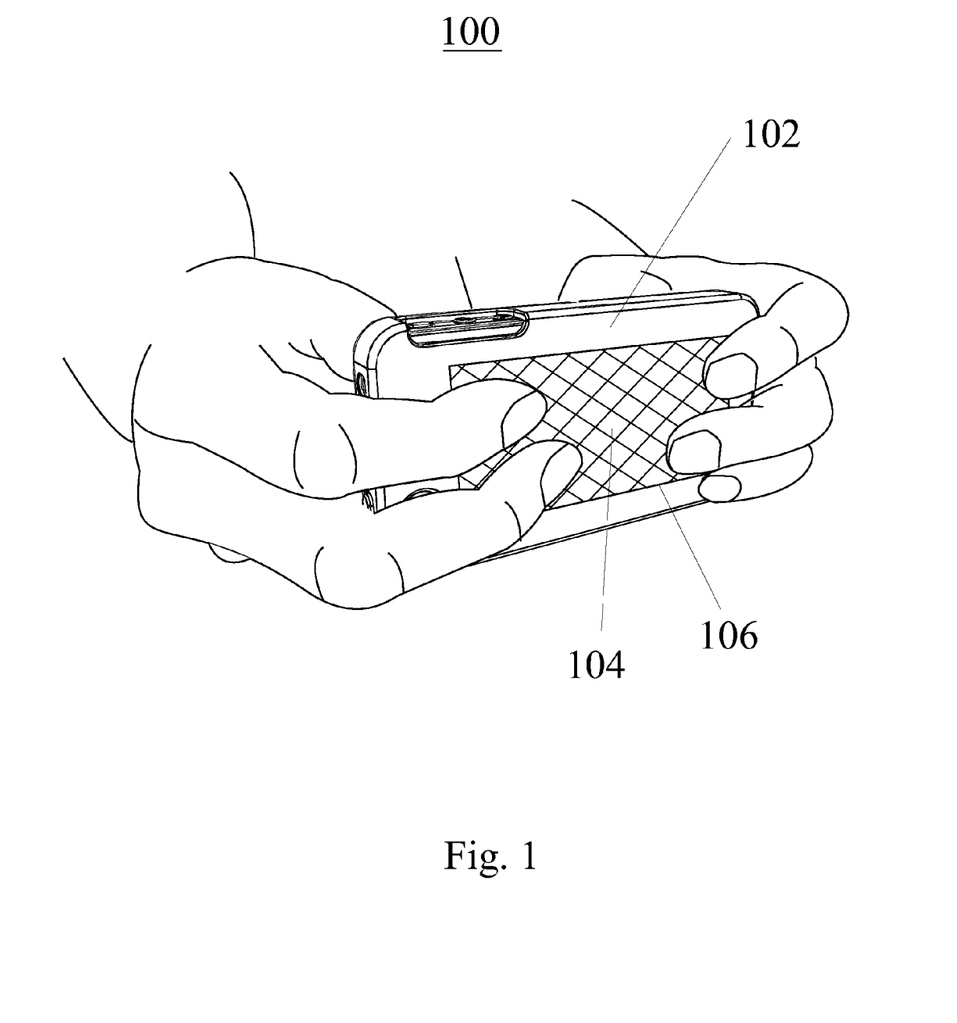
FIG. 1 shows a diagram of an example device case with a touch sensitive input device in accordance with at least one embodiment.

As shown in FIG. 1, an electronic device case 100 can include a body portion 102 at least partially covering the electronic device. The case can include a touch sensitive input device 104 that can have an edge portion 106 that is configured (e.g., raised) to provide a user with tactile guidance as to the location of the touch sensitive input device 104. The case can also include a processor configured to receive signals from the touch sensitive input device 104 and to transmit data representing those signals to the electronic device via a communications interface.

The electronic device (or mobile device) can include a wireless phone (iPhone, Droid, Blackberry, Palm OS device or the like), a tablet device (iPad or the like), a media player (iPod or the like), an electronic book reader (Kindle, Nook or the like), laptop computer, notebook computer or the like. The device can also include a wearable computer (e.g., glasses, watches and the like), a neural-gaming device or the like.

Figure 2:
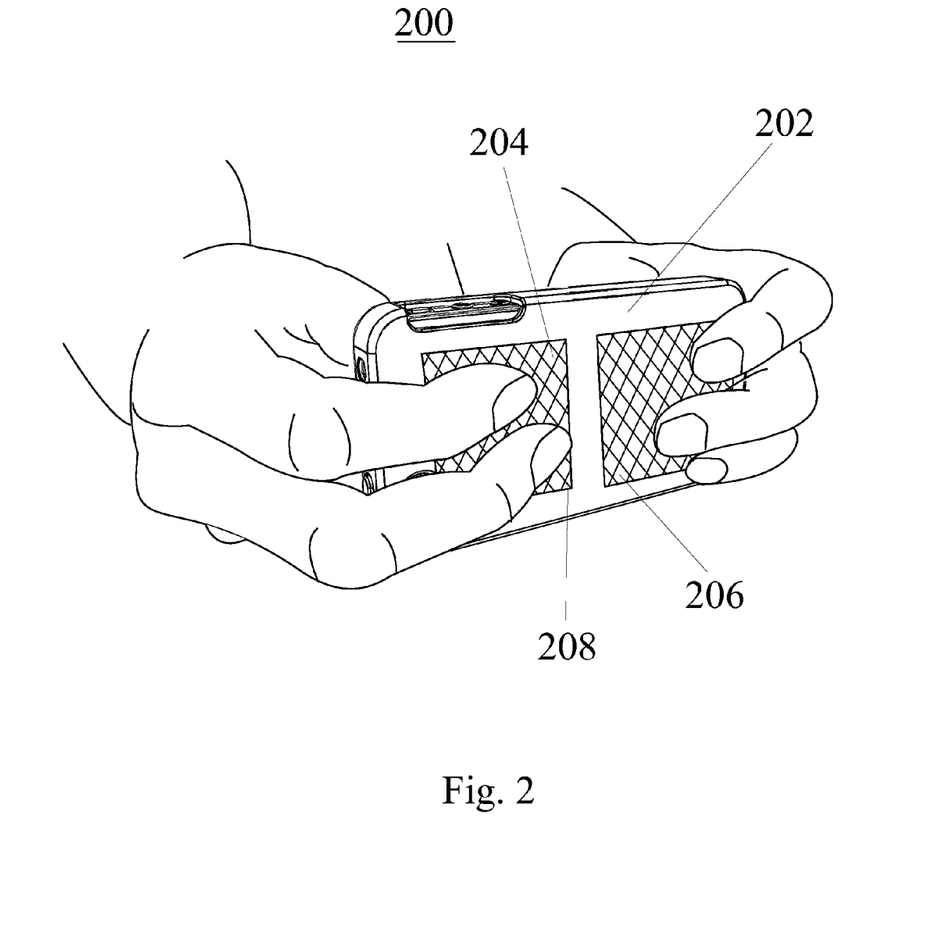
FIG. 2 shows a diagram of an example device case with a plurality of touch sensitive input devices in accordance with at least one embodiment.

FIG. 2 shows an example case system 200 having a body portion 202, a first touch sensitive input device 204, a second touch sensitive input device 206. Each touch sensitive input device can have an edge (e.g., 208) that provides tactile feedback to a user as to the location of the respective touch sensitive input devices.

An embodiment can include an interface (e.g., Bluetooth, USB, wireless USB, wired or wireless connection) for transmitting a signal from the touch sensitive input device(s) to the electronic device. The case can also include a processor and/or a power source. The processor can be used to collect signals from the touch sensitive input device(s) and transmit the signals to the electronic device via the interface. The power source can be used to power the touch sensitive input device(s), processor and/or interface.

The touch sensitive input device can include one or more of a resistive device, surface acoustic wave device, capacitive device (e.g., surface capacitive, projected capacitive, mutual capacitance, self-capacitance, or the like), infrared device, optical imaging device, dispersive signal device, acoustic pulse recognition device or the like.

An embodiment can also include a system having one or more touch sensitive input devices on an exterior (e.g., backside) of a case and a software program stored on a nontransitory computer readable medium and configured to be executed (or run) on the electronic device. The software program can be configured to provide an image on a display of the device of a location (or locations) of a user fingers on the touch sensitive input devices. The image or images can be partially transparent so as to permit the user to see both a location of the fingers on the touch sensitive input device(s) and to see the screen image simultaneously.

While the examples above show one and two touch sensitive input devices, it will be appreciated that an embodiment can include more than two separate touch sensitive input devices (e.g., one device for each finger of each hand). The separate touch sensitive input devices can be assigned the same or different functions (e.g., keyboard keys, game controller inputs or the like). Also, in addition to being disposed on a back exterior surface of the case, one or more touch sensitive input devices can be placed on other exterior surfaces of the case.

Figure 3:
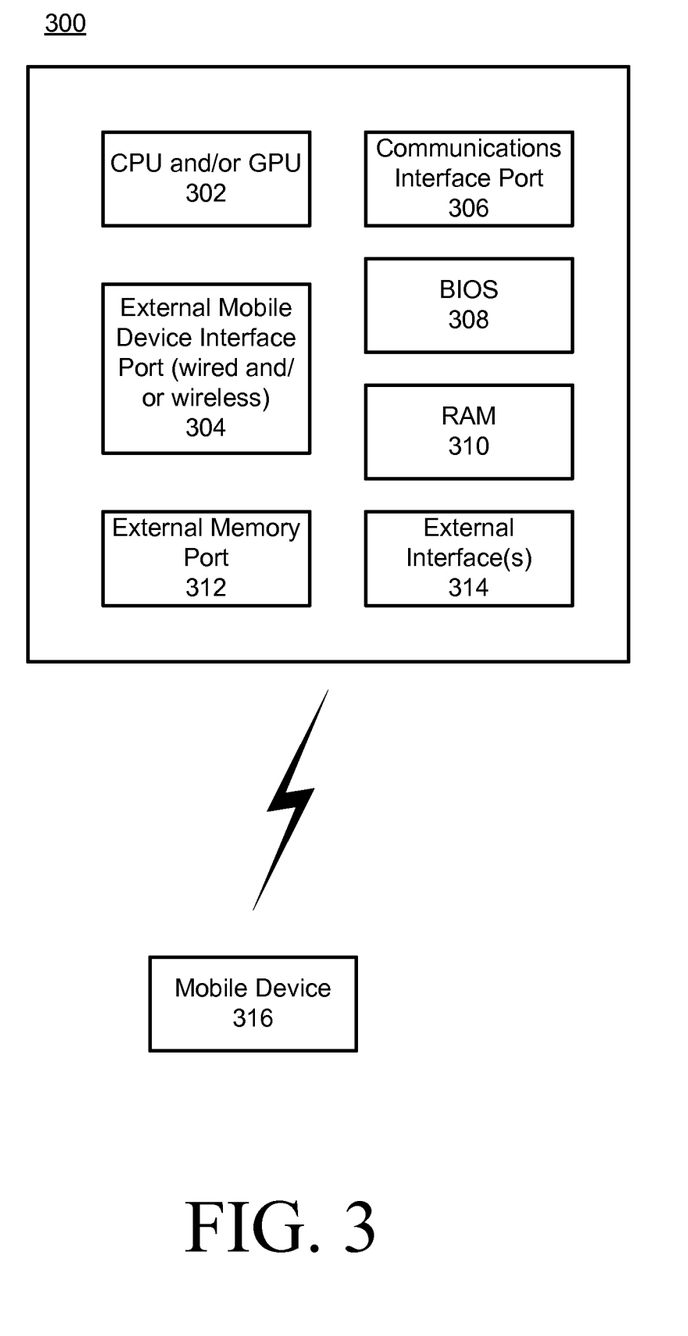
FIG. 3 shows a diagram of an example detachable console in accordance with at least one embodiment.

FIG. 3 shows a diagram of an example detachable console 300 in accordance with at least one embodiment. The system 300 includes a processor 302 (e.g., a CPU, GPU or both), mobile device interface 304, communications protocol interface port 306, optional BIOS 308, RAM 310, external memory card port 312, and one or more external interfaces 314.

The detachable console 300 is configured to be coupled (via wired interface, wireless interface, or both) to a mobile device 316. The external interfaces 314 can include one or more of a mini-USB, mini-HDMI, Ethernet (wired or wireless), WiFi, Bluetooth or the like.

In addition to the above mentioned components, the detachable console 300 can include one or more of user interface controls, a flash memory, ROM memory, operating system (stored in a memory device), operating system interface unit (e.g., for communicating between the operating system of the mobile device, e.g., iOS, and the operating system of the detachable console, e.g., Android, which can be different), cooling system (active, passive or both), battery and associated charging circuit, accelerometer (or "G" sensor), vibration unit to provide tactile feedback, speaker(s), and network adapters.

The processor 302 of the system 300 can perform some or all of the processing needed by an application executing on the mobile device. Also, the detachable console 300 can be used to download, store and playback bulk media data (e.g., video, audio, images and the like).

Figure 4:
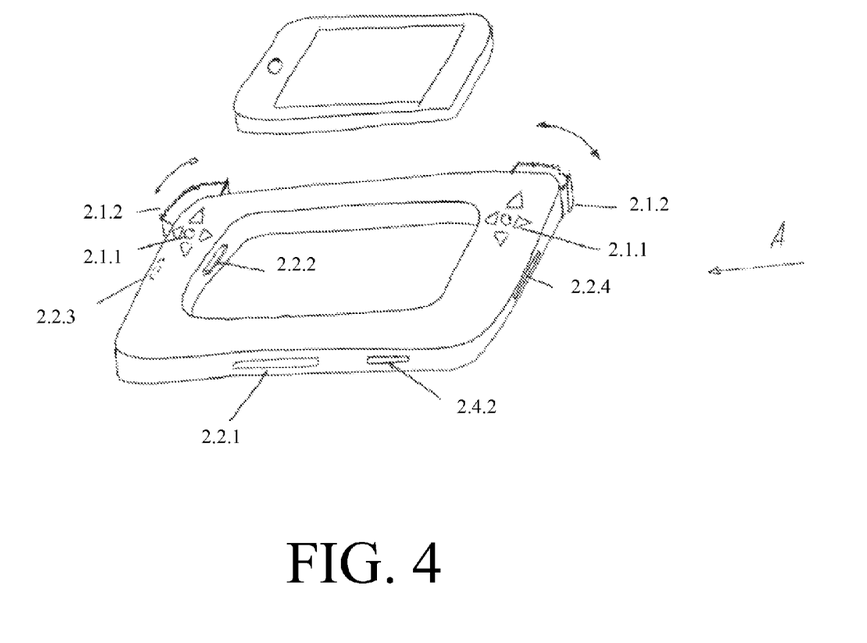
FIG. 4 shows a top-front perspective view of an example detachable console in accordance with at least one embodiment.
Figure 5:
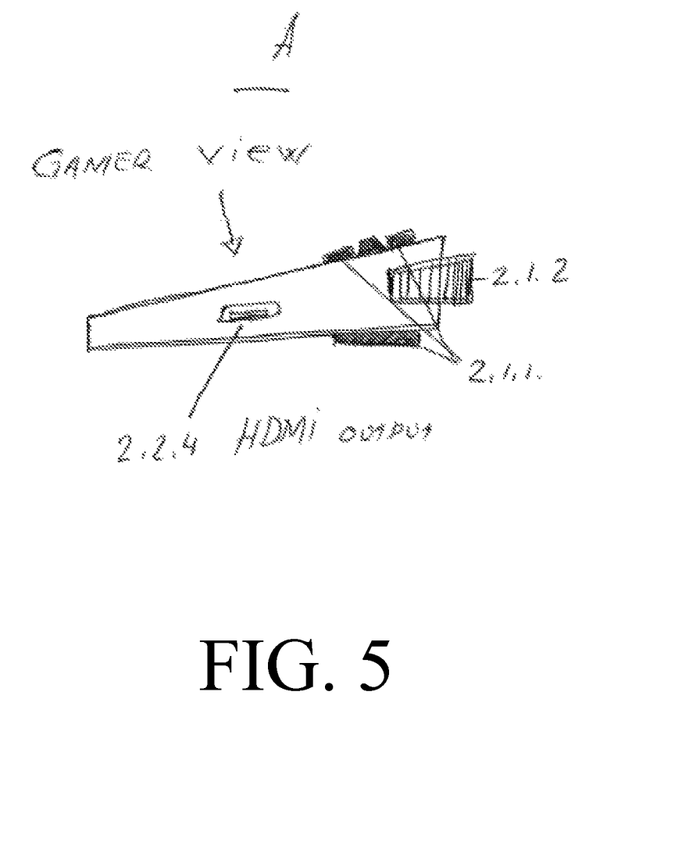
FIG. 5 shows a side plan view of an example detachable console in accordance with at least one embodiment.

FIGS. 4 and 5 show an example detachable console in accordance with at least one embodiment. The detachable console is configured to receive a mobile device (e.g., a wireless phone) and to connect to the mobile device via one or more interfaces such as physical interface port (e.g., 2.2.2) and wireless interface (e.g., WiFi, Bluetooth or the like). The system includes one or more joystick game input devices (2.1.1) and one or more thumb input devices (2.1.2).

The joystick game input devices (2.1.1) can include touchpad sensor or mechanical joystick-type buttons disposed on a front surface and/or a back surface of the detachable console. The joystick game input devices (2.1.1) can be located on each side of the device to accommodate playing left-handed, right-handed or with both hands. Also, the joystick game input devices (2.1.1) can be located on the detachable console at locations where the index and/or middle fingers would naturally be placed. The joystick game input devices (2.1.1) can include one or more input switches or sensors (e.g., one each for left, right, up, down and center).

The thumb input devices (2.1.2) can be corrugated or textured to permit better gripping force between the thumbs and the thumb input devices (2.1.2). The thumb input devices (2.1.2) may have an axis of movement (or rotation about a point) in a single plane (e.g., the x-axis plane) and an additional input signal from pressing the thumb input devices (2.1.2) as a button.

The user interface buttons can be programmed (or mapped) to perform specific functions. In addition to being used as game control input devices, the input devices can be mapped to perform function such as navigation in a web browser or the like.

The detachable console can also include one or more external interface connectors such as an external memory card slot (2.2.1), a mini-USB port (2.2.3) and a mini-HDMI port (2.2.4).

In addition to input controls and external interface ports, the detachable console can include a slot for a communications interface device (e.g., a SIM chip) for providing an enhanced communications capability (e.g., 4G LTE) to the mobile device.

Figure 6:
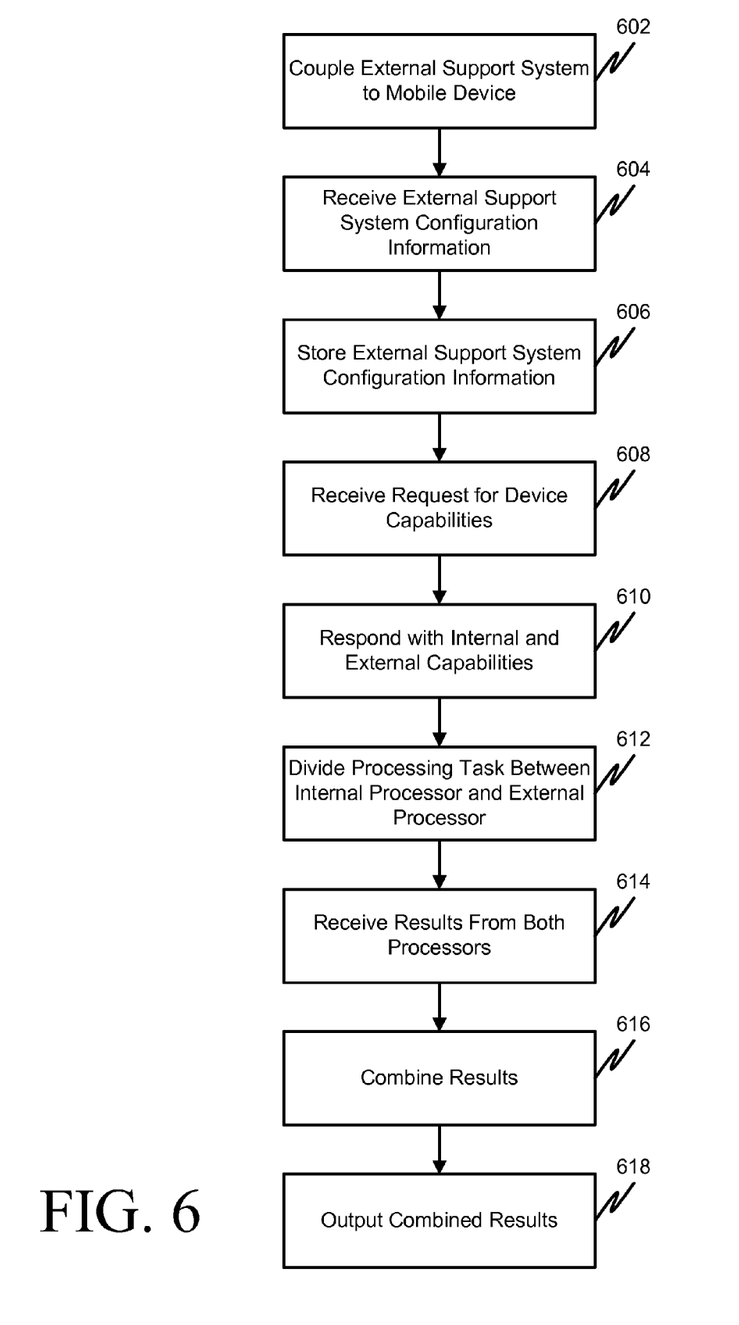
FIG. 6 is a chart of an example detachable console method in accordance with at least one embodiment.

FIG. 6 is a chart of an example detachable console method in accordance with at least one embodiment. Processing begins at 602, where a detachable console (e.g., as shown in FIGS. 3-5) is coupled (either wired or wirelessly) to a mobile device (e.g., iPhone, iPad, Android phone, ebook reader, media player or the like). Processing continues to 604.

At 604, detachable console configuration information is sent from the detachable console and received at the mobile device. Processing continues to 606.

At 606, detachable console configuration information is stored in the mobile device. Processing continues to 608.

At 608, the mobile device receives a request for capabilities (e.g., from a software application that is executing on the mobile device). Processing continues to 610.

At 610, the mobile device responds to the request with information about internal and external capabilities (including information based on the detachable console configuration information received in step 604). Processing continues to 612.

At 612, a processing task is divided between the internal processor of the mobile device and the external support processor of the detachable console. The processing task can be divided using known or later developed multi-processor techniques. Processing continues to 614.

At 614, results are received from the internal processor and the external processor. Processing continues to 616.

At 616, the results from the internal processor and the external support processor are combined into a combined result. Processing continues to 618.

At 618, the mobile device processor outputs a result based on the combined result (e.g., updates the display according to graphics images in the combined result).

It will be appreciated that 602-618 can be repeated in whole or in part in order to accomplish a contemplated processing task using an detachable console.

In addition to processing, the detachable console can provide data storage/retrieval and/or communications support.

Figure 7:
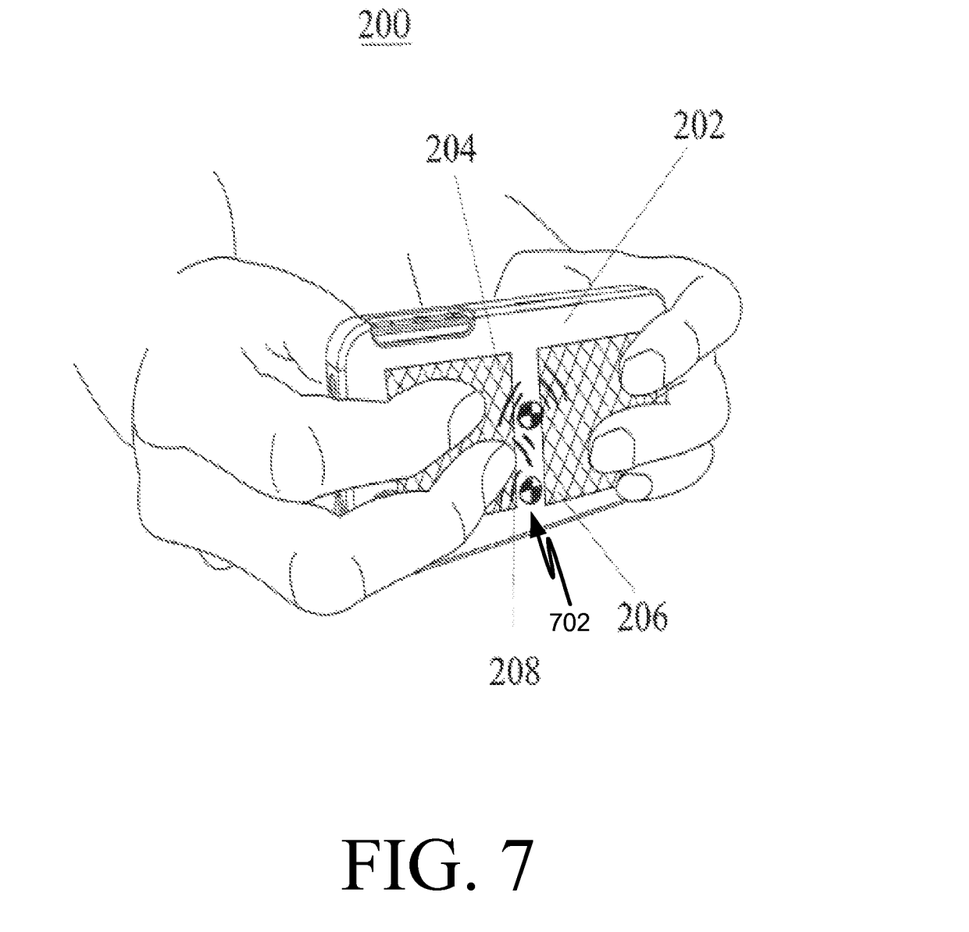
FIG. 7 is a diagram of an example device case with an optical touch pad input device in accordance with at least one embodiment.
Figure 8:
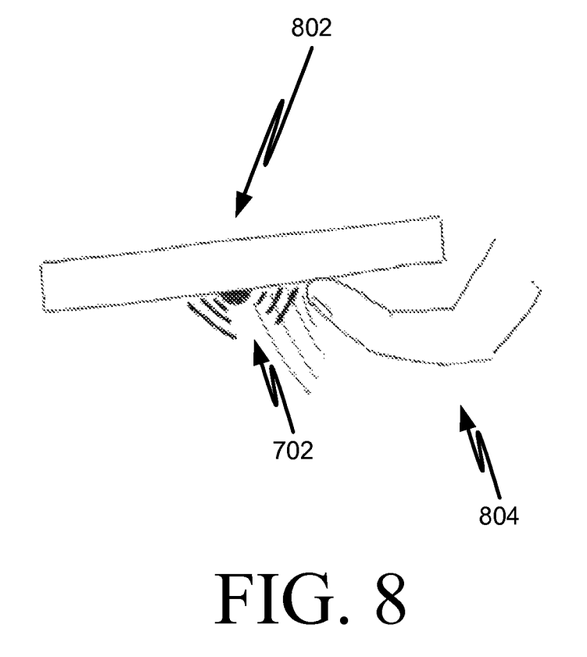
FIG. 8 is a side view diagram of the optical touch pad of FIG. 7.

FIG. 7 is a diagram of an example device case with an optical touch pad input device in accordance with at least one embodiment. A device case (e.g., 200) can include one or more optical touch pad transceivers 702. FIG. 8 is a side view diagram of the optical touch pad of FIG. 7, and shows the optical transmit signal and return signal.

Figure 9A:
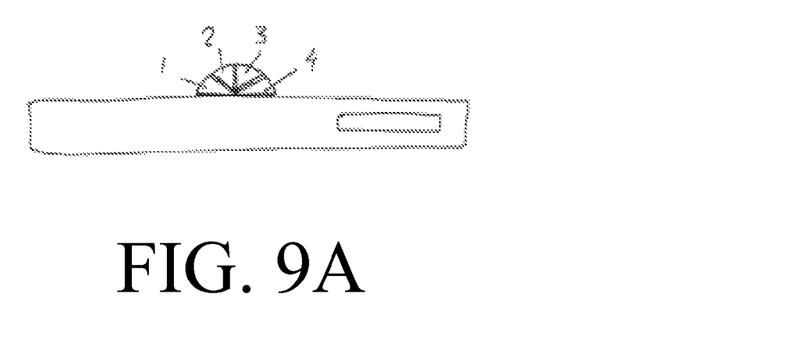
FIGS. 9A-9C are side view diagrams of the optical touchpad of FIG. 7.
Figure 9B:
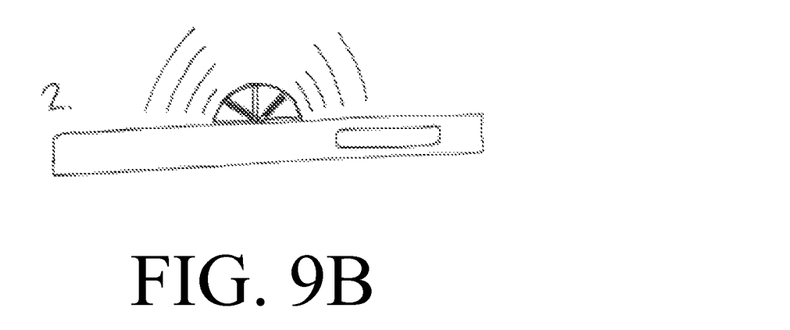
Figure 9C:
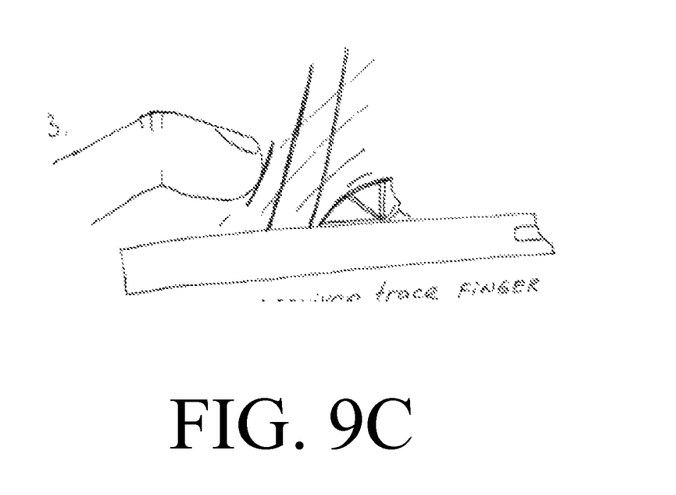

FIGS. 9A-9C are side view diagrams of the optical touchpad of FIG. 7. In particular, an optical touchpad transceiver can include a plurality of component zones. As shown in FIG. 9A, the can be a first zone 1, a second zone 2, a third zone 3 and a fourth zone 4. Zones 1 and 4 can be a source of light (e.g., infrared light, LED or other illuminator). Zones 2 and 3 can be receivers or transducers. The illuminator is on in the diagram shown in FIG. 9B.

In 9C, the receiver (e.g., 2) is receiving a trace finger movement.

Figure 10:
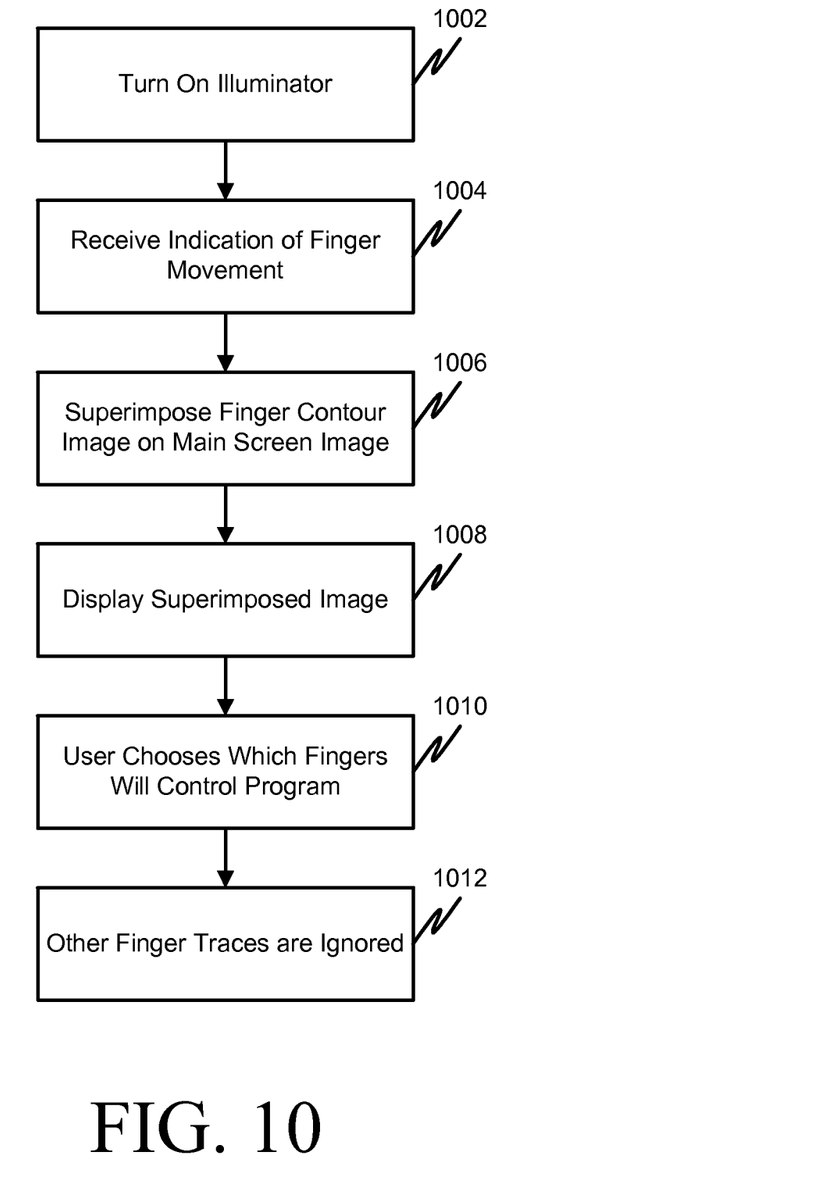
FIG. 10 is a flow chart of an example method for auxiliary touch sensitive control in accordance with at least one embodiment.

FIG. 10 is a flow chart of an example method for optical touch pad control in accordance with at least one embodiment. Processing begins at 1002, where one or more illuminators is turned on. Processing continues to 1004.

At 1004, finger movement indications are received from the receivers (e.g., 2 and/or 3). Processing continues to 1006.

At 1006, the system can superimpose finger contour image on main screen image. Processing continues to 1008.

At 1008, the superimposed image is displayed. Processing continues to 1010.

At 1010, the user chooses which fingers will control program. Processing continues to 1012.

At 1012, other finger traces are ignored and/or removed from the display.

It will be appreciated that 1002 to 1012 can be repeated in whole or in part. For example, 1004-1012 can be performed using an auxiliary touch sensitive input device other than an optical touch sensor (e.g., a capacitive sensor).

Figure 11:
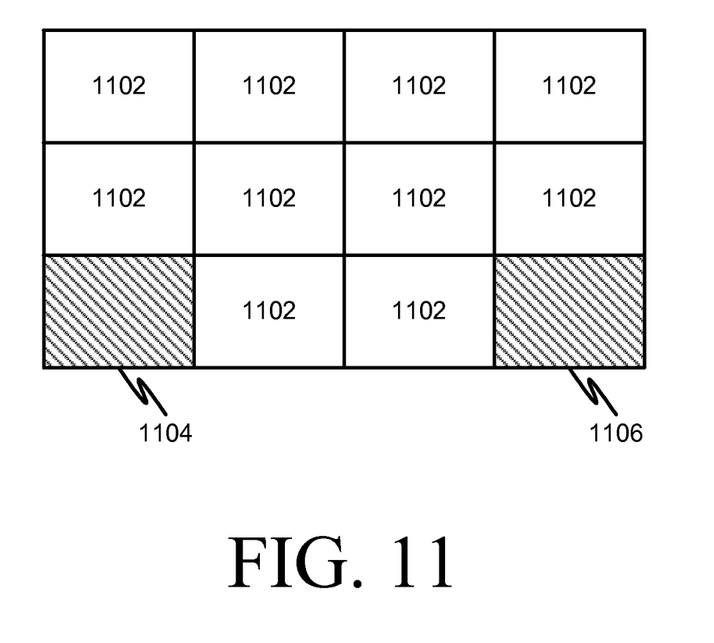
FIG. 11 is a diagram of an example calibration user interface for an auxiliary touch sensitive input device in accordance with at least one embodiment.

FIG. 11 is a diagram of an example calibration user interface for an auxiliary touch sensitive input device. The calibration interface includes a plurality of elements (1102-1106) each corresponding to a respective section of the auxiliary touch sensitive input device(s). Each of the elements (1102-1106) can be toggled (e.g., by touch selection or the like) to a first state indicating an active control section of the auxiliary touch sensitive input device(s) (elements labeled 1102) or to a second state indicating a non-control section of the auxiliary touch sensitive input device(s) (1104 and 1106).

Figure 12:
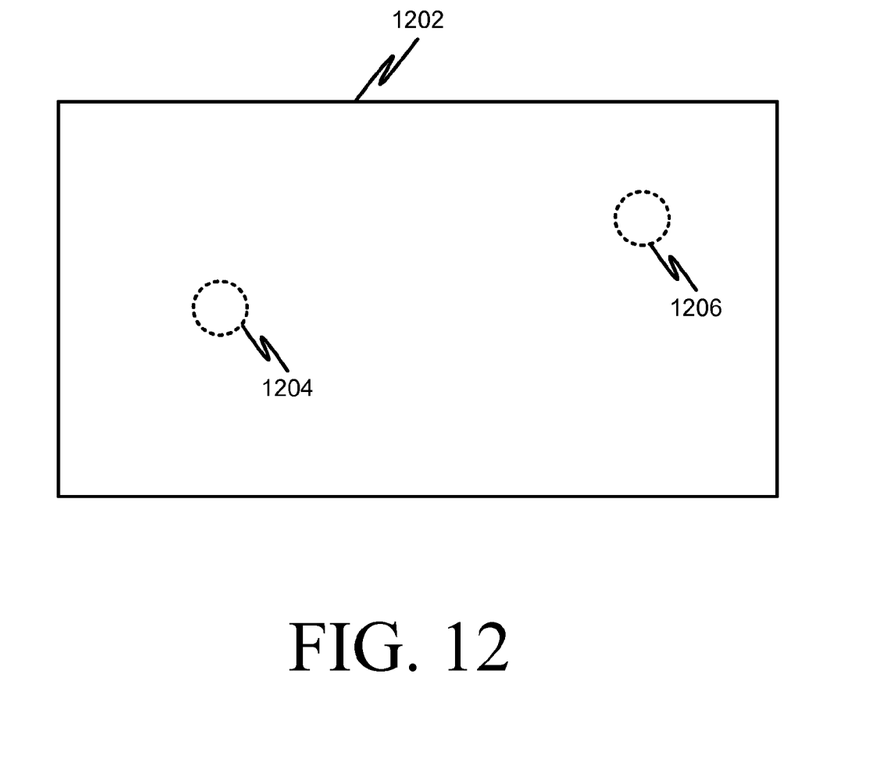
FIG. 12 shows a diagram of an example device screen showing symbology indicating touch points being activated on auxiliary touch sensitive input device(s) in accordance with at least one embodiment.

FIG. 12 shows an example device screen 1202 showing symbology (1204 and 1206) corresponding to points being touched on the auxiliary touch sensitive input device(s). The symbology can include one or more graphical representations of points being touched (or activated) on the auxiliary touch sensitive input device(s) and can be overlaid on other applications being displayed on the device screen (e.g., a game or other application).

In addition to the example devices described above, the mobile device can include augmented reality systems (e.g., Google Glass or the like), furniture or wall mounted displays or the like.

It is, therefore, apparent that there is provided, in accordance with the various embodiments disclosed herein, an detachable console configured to augment the capabilities of a mobile device.

While the disclosed subject matter has been described in conjunction with a number of embodiments, it is evident that many alternatives, modifications and variations would be or are apparent to those of ordinary skill in the applicable arts. Accordingly, Applicant intends to embrace all such alternatives, modifications, equivalents and variations that are within the spirit and scope of the disclosed subject matter.

What is claimed is:

1. A detachable case having a front side and a back side, the detachable case being configured to receive an electronic device on the front side of the detachable case, the electronic device including a display screen and a first data transmission interface, the display screen being positionable to face away from the front side of the detachable case, the detachable case comprising:

at least one touch sensitive input device located on the back side of the detachable case opposite to the display screen of the electronic device, the at least one touch sensitive input device being configured to receive one or more touch contacts from a user; and a second data transmission interface operatively connected to the first data transmission interface of the electronic device, the second data transmission interface being configured to transfer control input signals received on the at least one touch sensitive input device located on the back side of the detachable case to the electronic device via the first data transmission interface, thereby causing the electronic device to display on the display screen of the electronic device an indication of a position of the one or more touch contacts received on the at least one touch sensitive input device.

2. The detachable case of claim 1, wherein the electronic device is configured to display a calibration user interface corresponding to the at least one touch sensitive input device located on the back side of the detachable case, the calibration user interface including at least one element each corresponding to a respective area on the at least one touch sensitive input device, wherein each element can be toggled by touch selection to be in a first state indicating that the corresponding area is an active control section of the at least one touch sensitive input device or in a second state indicating that the corresponding area is a non-control section of the at least one touch sensitive input device.

3. The detachable case of claim 1, wherein the first data transmission interface and the second data transmission interface are operatively connected via a wireless connection.

4. The detachable case of claim 1, wherein the first data transmission interface and the second data transmission interface are operatively connected via a wired connection.

5. The detachable case of claim 1, wherein the electronic device is a smartphone.

6. The detachable case of claim 1, wherein the electronic device is a tablet.

7. A combination of an electronic device and a detachable case, the electronic device including a display screen and a first data transmission interface, the detachable case including a front side, a back side, at least one touch sensitive input device located on the back side of the detachable case and a second data transmission interface, the at least one touch sensitive input device being configured to receive one or more touch contacts from a user, wherein:

the detachable case is configured to removably receive the electronic device on the front side of the detachable case, the display screen of the electronic device is positionable to face away from the front side of the detachable case;

the first data transmission interface is operatively connected to the first data interface; and the second data transmission interface is configured to transfer control input signals received on the at least one touch sensitive input device located on the backside of the detachable case to the electronic device via the first data transmission interface, thereby causing the electronic device to display on the display screen of the electronic device an indication of a position of the one or more touch contacts received on the at least one touch sensitive input device.

* * * * *